Aug. 10, 1965 G. NICHOLS 3,200,169
ALUMINUM CHLORIDE CATALYZED POLYMERIZATION PROCESS
Filed Feb. 21, 1962
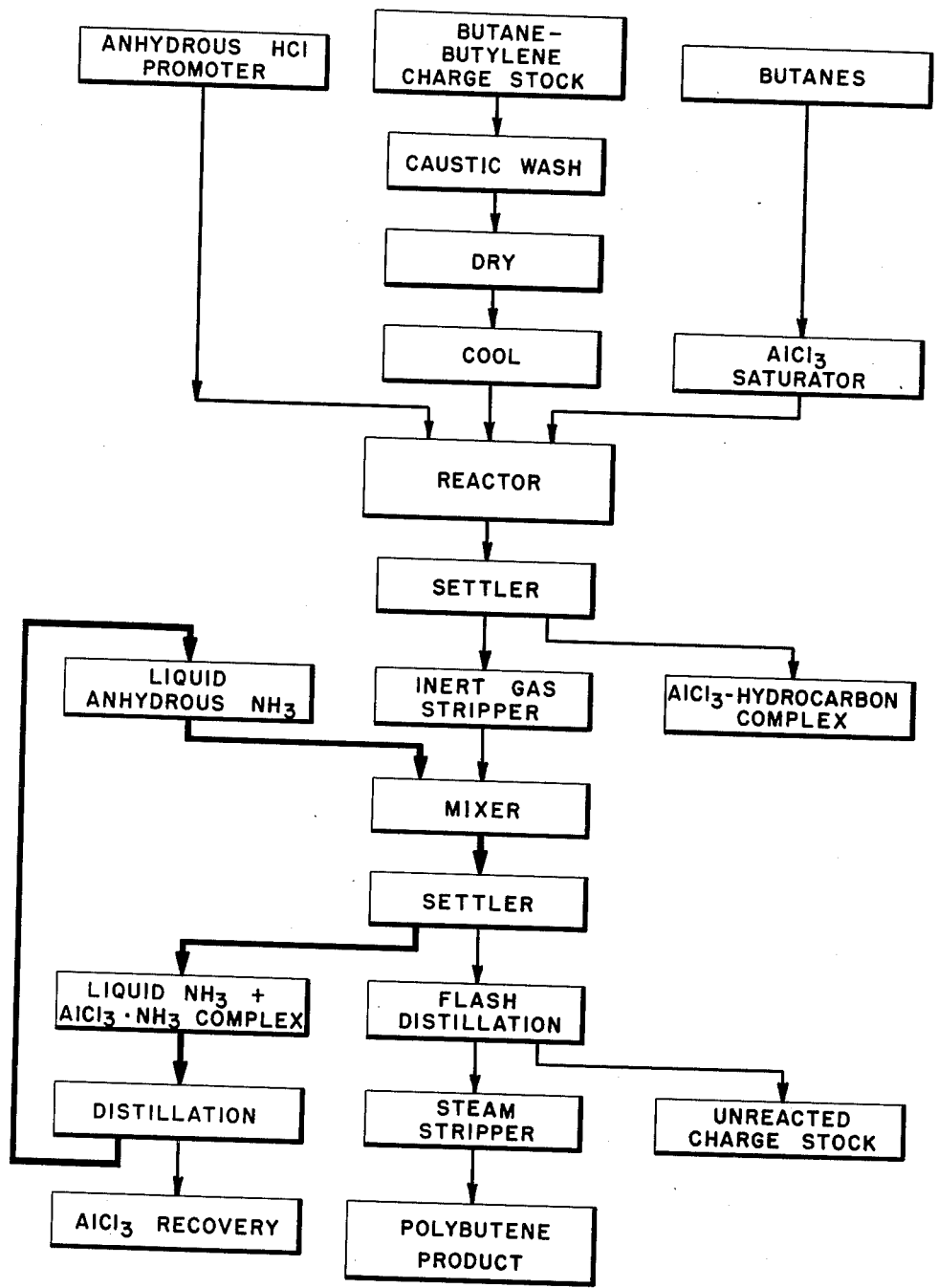
INVENTOR.
Gus Nichols
BY
ATTORNEY

United States Patent Office 3,200,169
Patented Aug. 10, 1965

3,200,169
ALUMINUM CHLORIDE CATALYZED POLYMERIZATION PROCESS
Gus Nichols, Whiting, Ind., assignor to Standard Oil Company, Chicago, Ill., a corporation of Indiana
Filed Feb. 21, 1962, Ser. No. 175,874
4 Claims. (Cl. 260—683.15)

This invention relates to a process for the polymerization of propylene or butylenes with an aluminum chloride catalyst to form viscous liquid olefin polymers. More particularly, it concerns an improved method of separating the aluminum chloride catalyst from reaction mixtures obtained in the aforesaid process.

It has long been known that normally gaseous olefins such as propylene or the various butylenes may be converted to viscous liquid polymers by means of an aluminum chloride catalyst, the catalyst being present as a double compound or complex with hydrocarbons. While such polymerization processes are in wide use, certain problems remain with respect to obtaining clean polymer products.

In the past, much of the polymer quality problem has centered around the removal of aluminum chloride-hydrocarbon complex catalyst from the reaction mixtures. Unless substantially all of the catalyst is so removed, the polymer will be yellowish or even brown, and becomes darker colored upon exposure to atmospheric oxygen.

Recently it has been discovered that aluminum chloride may be removed from polymerization reaction mixtures by treatment with anhydrous ammonia in a proportion sufficient to form an aluminum chloride-ammonia complex; the complex is gel-like or solid, and is readily separable by settling, filtration, or other solid-liquid separation techniques. It is an object of the present invention to provide a further improvement on the ammonia treatment procedure, which improvement affords polymer having superior color than was heretofore obtainable. In most instances, the resultant olefin polymers are water white, haze free, and color stable after exposure to oxygen.

According to the invention, the aluminum chloride-ammonia complex is separated from the reaction mixture by dissolving the complex in excess anhydrous liquid ammonia, and thereafter separating the hydrocarbon phase from the immiscible liquid ammonia phase containing the dissolved $AlCl_3=NH_3$.

The use of the inventive process serves several functions. First, and primarily, it facilitates removal of aluminum chloride by permitting such removal to be accomplished between two liquid phases, rather than as between a solid and a liquid as heretofore. It is thus manifest that separations may thus be accomplished more readily and with more complete removal of aluminum chloride from the hydrocarbon portion of the reaction mixture. In addition, the excess ammonia is present to react with any free hydrogen chloride (or other chlorides) employed during the reaction as a catalyst promoter; the resultant ammonium chloride is sufficiently soluble in the liquid ammonia phase. Lastly, the liquid ammonia treating agent may readily be regenerated by distillation, leaving a bottoms consisting primarily of aluminum chloride-ammonia complex. As a result of the foregoing advantages, substantially all of the aluminum and all of the chloride are removed from the hydrocarbon reaction mixture, thereby permitting olefin polymer to be recovered which is virtually entirely free from any ingredients which would otherwise tend to discolor the polymer or to reduce its color stability.

As a result of the inventive treatment, it is also possible to minimize or eliminate many of the prior art polymer clean-up procedures. Heretofore such steps as clay treatment, caustic and/or water washing, nitrogen stripping, etc. have all been employed to improve polymer color. However by means of the present invention such treatments may be reduced in severity or even entirely eliminated from a commercial processing scheme.

An understanding of the invention will be facilitated from the attached drawing, which schematically depicts the illustrative embodiment discussed below.

As applied to a typical continuous polymerization of normal and isobutylene in a petroleum refinery butane-butylenes stream, or from any other source, dry butanes, suitably a depropanized and mercaptan-free butane stream at a temperature of about 175° F.–200° F., e.g., about 180° F. and about 395 p.s.i.a., are passed into the top of a saturator containing a bed of aluminum chloride catalyst. The butane flows through the bed of aluminum chloride at a rate adequate to form an aluminum chloride saturated solution of butanes containing from about 4 pounds to about 10 pounds of aluminum chloride per barrel of the hydrocarbon leaving the bottom of the saturator.

The effluent from the saturator at a temperature of about 175° F., and a dried butane-butylene stream cooled by suitable heat exchange means to a temperature of from about 10° F. to about 30° F., e.g., about 20° F., are separately introduced into the bottom of a polymerization reactor maintained at a temperature of from about 0° F. to about 80° F., preferably about 20° F. to about 40° F. by suitable refrigeration means, such as for example, propane or ammonia refrigeration, and at a sufficient pressure to insure liquid conditions, e.g., about 50–100 p.s.i.g. The aluminum chloride-saturated butanes and the butylenes feed are introduced into the reactor in a proportion to provide a ratio of 0.5 to 1.5 pounds catalyst per 100 pounds of olefin in the charging stock. The reactor temperature should be carefully controlled since while increased reactor temperatures increases conversion of total butylenes, it decreases the amount of heavy polymer in the total polymer product.

In some instances it is desirable to employ anhydrous hydrogen chloride as a catalyst promotor. In this event, anhydrous hydrogen chloride may be added to the reaction zone, advantageously in an amount which will be from about 1 percent to about 50 percent, preferably from about 5 to about 20 percent, by weight of the aluminum chloride (hydrocarbon-free basis) in such zone.

The reactor effluent consisting of polymerized butylenes, aluminum chloride hydrocarbon complex, unreacted hydrocarbons and optional excess HCl, are then advantageously passed to a settling drum wherein the major amount of the complex is settled out and withdrawn. The effluent from the settling drum comprises of a solution of polymers containing small amounts of the aluminum chloride complex and unreacted hydrocarbons is preferably treated by mixing a large excess of anhydrous liquid ammonia with said effluent at a temperature of about 32°–160° F. whereby the aluminum chloride is converted to an aluminum chloride-ammonia complex. The proportion of anhydrous liquid ammonia relative to liquid reaction mixture may vary over wide ranges, and may be from as little as 1:100 or less, to as much as 10:1, or even more. It will be appreciated that the precise amount depends on the initial concentration of aluminum chloride-hydrocarbon complex catalyst in the reaction mixture, with higher catalyst concentrations calling for more liquid ammonia to dissolve the aluminum chloride-ammonia complex. Similarly, higher ammonia treatment temperatures are apparently more conducive to higher solubility of the aluminum chloride-ammonia complex in the liquid ammonia. Sufficient pressure is employed to maintain the ammonia in the liquid phase, e.g., from atmospheric pressure to say 500 p.s.i.g., depending on the temperature.

After separation and removal of the aluminum chloride-ammonia complex by such liquid-liquid physical means as decantation, settling, cycloning, centrifugation, or the like, the clear butylenes polymers solution is flash distilled in a flash drum to remove therefrom unreacted hydrocarbons and dissolved $NH_3$, and then passed to a steam stripper (preferably operating at low or subatmospheric pressure) for fractionation into suitable polymer fractions. The unreacted hydrocarbons from the flash drum can be treated, e.g., by fractionation, to remove $NH_3$ and then suitably recycled to the butylenes feed stream in amounts necessary to obtain a feed stream of desired composition.

While the invention is applicable to liquid phase polymerization of normally gaseous olefins, such as propylene, isobutylene, normal butylenes, and mixtures thereof, it is primarily directed to the polymerization of a butane-butylene mixture associated with butanes in so-called butane-butylene refinery stream. For example, the charging stock may be a petroleum refinery butane-butylene stream containing about 26 weight percent isobutylene, about 37 weight percent normal butylenes, and about 36 weight percent butanes, such stocks usually containing a small amount of propane, propylene, pentanes, and/or pentenes.

The polymers from the inventive process are characterized by being free from haze due to colloidal alumina resulting from aluminum chloride hydrolysis; are of improved color without need for drying and clay treating, cannot cause downstream equipment corrosion for the reason that virtually all of the aluminum chloride has been removed, and are virtually water white and remain so after exposure to air.

The invention will be more fully exemplified in the following illustrative embodiment which describes a complete polymerization supplemented by the inventive treatment with anhydrous liquid ammonia.

*Illustrative embodiment*

A butane-butylene charging stock is washed with a 10 percent caustic solution to remove any mercaptan sulfur and then dried by passing over calcium chloride. The dried stream of charging stock is then cooled to a temperature of about 20° F. (which can be varied from about 0° F. to about 80° F. in order to regulate polymer molecular weight).

Simultaneously, a butanes stream free of mercaptans, water, and butenes, is passed downward through a saturator vessel charged with solid aluminum chloride; the inlet temperature is about 175–200° F., and the inlet pressure is about 395 p.s.i.a. in order to maintain a liquid phase in the saturator.

The saturator effluent consists of butanes having dissolved therein about 5 pounds of aluminum chloride per barrel of butanes, and is passed, along with the butane-butylene charging stock, into the bottom of a suitable agitated reactor vessel. A temperature of about 20° F. is maintained in this vessel by propane refrigeration. The overall concentration of aluminum chloride is preferably within the range of about 0.5 to 1.5 pounds of aluminum chloride per 100 pounds of butylene (butane-free basis).

Simultaneous with the introduction of catalyst and feed stock, anhydrous HCl as a catalyst promoter is introduced into the reactor vessel in a proportion sufficient to provide about 10 percent of HCl based on aluminum chloride (hydrocarbon-free basis).

The reaction mixture is maintained in the reactor vessel for a sufficient time to effect substantial polymerization of the butylenes in the charging stock. Thereafter, product effluent is withdrawn from near the top of the vessel, and consists of polymerized butylenes, aluminum chloride-hydrocarbon complex, excess HCl, and unreacted hydrocarbons such as butylenes and butanes. It is then passed to a settling vessel wherein the bulk of the entrained catalyst complex settles out over a half hour period.

At this point, preceding treatment with anhydrous ammonia, it is desirable to strip any free HCl (including that formed by hydrolysis of aluminum chloride with traces of moisture in the feed stock) from the reaction mixture by nitrogen or other inert gas stripping of the crude polymer solution. This minimizes the formation of ammonium chloride which, although tolerable, imposes an additional solvent recovery problem.

The settled liquid portion of the reaction mixture is then mixed in a suitably agitated vessel with an equal volume of anhydrous ammonia to form the stoichiometric $AlCl_3$-$NH_3$ complex and to dissolve substantially all of the same. Two immiscible liquid phases are formed, the heavier consisting essentially of hydrocarbon while the lighter phase is ammonia containing the aluminum chloride-ammonia complex (and any ammonium chloride dissolved therein). These two phases may be separated by any liquid-liquid phase separation technique, e.g., settling and decantation, and thereafter processed separately.

The liquid ammonia phase may be recovered and recycled by subjecting all or a portion of this phase to single-plate, or flash, distillation to remove the ammonia as an overhead which may then be condensed and recycled. The bottoms, consisting essentially of aluminum chloride and any ammonium chloride, may be either discarded or else treated for aluminum chloride recovery, as by the addition of aqueous or anhydrous hydrochloric acid, or with other acids such as sulfuric acid.

The resultant catalyst-free hydrocarbon phase, consisting of clear polymers and unreacted hydrocarbons, is then heated and flashed into a flash drum at a pressure of about 100 p.s.i.g. The drum advantageously has a top temperature of about 300° F. and a bottom temperature of about 320° F. Here the unreacted hydrocarbons (together with any dissolved ammonia) are taken overhead, condensed, and collected.

From the base of the flash drum, the polymer mixture is withdrawn and then steam stripped in a distillation tower at e.g. 600° F. and atmospheric or reduced pressure; an inert gas may be introduced below the steam-introduction point to insure removal of all water from the heaviest polymer fractions. If conducted at atmospheric pressure utilizing 110 pound steam, a heavy polymer fraction may be withdrawn from the bottom of the stripping tower at about 475° F. while a lighter polymer fraction is taken from the top at about 110° F.

The production of polymers of various molecular weights may be effected by altering reaction conditions. Lower temperatures favor the production of higher molecular weight, more viscous, polymers, as does increasing the ratio of isobutylene to normal butylene in the feed stock.

The final polymer products, both light and heavy, are water white with no trace of yellow color. The Gardner colorimeter reading is about 0. There is substantially no aluminum or chloride in the polymer.

Thus it is evident that there has been provided an outstanding process for making butylene or propylene polymers of unusual color stability. Although described in conjunction with a preferred specific embodiment above, various other alternatives, modifications, and variations of the invention will be evident to those skilled in the art, and accordingly it is intended to embrace all alternatives, modifications, and variations as fall within the spirit and broad scope of the appended claims.

I claim:

1. In a process wherein normally gaseous olefins selected from the class consisting of propylenes, butylenes, and mixtures thereof are polymerized with an aluminum chloride catalyst to form a reaction mixture comprising olefin polymer in admixture with aluminum chloride-hydrocarbon complex, and wherein at least a portion of said reaction mixture is treated with anhydrous ammonia to form a separable aluminum chloride-ammonia complex, the improvement comprising commingling said portion with sufficient excess liquid anhydrous ammonia to dissolve said aluminum chloride-ammonia complex, and thereafter separating the resulting complex-free hydrocarbon phase from an immiscible liquid ammonia phase containing the dissolved aluminum chloride-ammonia complex.

2. The process of claim 1 wherein said normally gaseous olefins are butylenes.

3. The process of claim 1 wherein said normally gaseous olefins are a mixture of butylenes and isobutylenes.

4. The process of claim 1 wherein said normally gaseous olefins are propylene.

References Cited by the Examiner
UNITED STATES PATENTS 2,291,510  7/42  Thomas et al. _____ 260—683.15
2,677,002  4/54  Yahnke et al. _____ 260—683.15

ALPHONSO D. SULLIVAN, *Primary Examiner.*